United States Patent
Kubo et al.

(10) Patent No.: US 6,379,836 B1
(45) Date of Patent: Apr. 30, 2002

(54) SEPARATOR PAPER FOR ALKALINE-BATTERY

(75) Inventors: Yoshiyo Kubo, Kochi; Motoi Yamanoue, Tosa; Akio Mizobuchi, Kochi, all of (JP)

(73) Assignee: Nippon Kodoshi Corporation, Kochi-ken (JP)

( * ) Notice: Subject to any disclaimer, the term of this patent is extended or adjusted under 35 U.S.C. 154(b) by 0 days.

(21) Appl. No.: 08/924,307

(22) Filed: Sep. 5, 1997

(30) Foreign Application Priority Data

Sep. 12, 1996 (JP) .............................................. 8-265147

(51) Int. Cl.⁷ ................................................ H01M 2/16
(52) U.S. Cl. ........................ 429/144; 429/145; 429/249; 429/250; 429/247
(58) Field of Search ................................ 429/144, 145, 429/249, 250

(56) References Cited

U.S. PATENT DOCUMENTS 5,366,832 A * 11/1994 Hayashi et al. .............. 429/249

FOREIGN PATENT DOCUMENTS

| EP | 0 228 603 | * 7/1987 | ............ H01M/2/16 |
| JP | 62-154559 | 7/1987 | |
| JP | 2-119049 | * 5/1990 | ............ H01M/2/16 |
| JP | 5-74439 | 3/1993 | |

* cited by examiner

*Primary Examiner*—Gabrielle Brouillette
*Assistant Examiner*—Angela J. Martin
(74) *Attorney, Agent, or Firm*—Shlesinger Arkwright Garvey LLP

(57) ABSTRACT

A separator paper is provided which simultaneously satisfies the requirements to have a high denseness that can prevent internal shortage due to such as the deposition of the zinc oxide dendrite accompanied by not adding mercury, and a high liquid impregnate properties that can improve heavy discharging properties. Said separator paper comprises a dense layer having a certain degree of denseness, and a liquid impregnate layer having a certain degree of liquid impregnate properties, said dense layer and said liquid impregnate layer being integrally laminated, and said dense layer being made by mixing alkali proof cellulose fibers which is applicable for beating with synthetic fibers such that said alkali proof cellulose fibers be included in the range of 20 to 80 weight % with the beating degree of 500 ml to 0 ml at CSF value, and said liquid impregnate layer being made by mixing alkali proof cellulose fibers with synthetic fibers such that said alkali proof cellulose fibers be included in the range of 20 to 80 weight % with the beating degree of more than 700 ml at CSF value.

16 Claims, 4 Drawing Sheets

SEPARATOR PAPER FOR ALKALINE-BATTERY

BACKGROUND OF THE INVENTION

1. Field of the Invention

The present invention relates to a separator paper for isolating an anode active material and a cathode active material in several alkaline-batteries, such as the alkaline-manganese battery, the silver oxide battery, and the air-zinc battery, in each of which the alkali electrolyte is used, and more specifically relates to the separator paper which has high denseness capable of preventing an internal shortage caused by zinc oxide dendrite due to not adding mercury, and which simultaneously has a higher heavy discharging performance due to increased liquid impregnate properties of the electrolyte.

2. Description of the Prior Art

A characteristic property required of the separator for isolating the anode active material and the cathode active material in alkaline-batteries, is to prevent internal shortage caused by touching of the anode active material with the cathode active material, in order to have a desirable durability, due to the fact that it does not cause shrinkage or deformation with use of a depolarization agent such as potassium hydroxide and manganese dioxide, and to hold sufficient quantity of the electrolyte required of produce electromotive without blocking the ionic conduction.

The separator paper of the prior art uses a paper of mixed paper making consisting of synthetic fiber and cellulose fiber, more specifically, it is mixed with vinylon fiber of alkali proof synthetic fiber as the main material, viscose rayon fiber of acid proof cellulose fiber, linter pulp including more than 98% α-cellulose, mercerized wood pulp, polynosic rayon fiber, and polyvinyl alcohol fiber added as a binder.

The present applicant has disclosed a separator paper in the Japanese Patent Laid-Open Publication No.2-119049, in which by mixing alkali proof cellulose fibers applicable for beating, such as mercerized wood pulp, mercerized esparto pulp, mercerized Manila hemp pulp, polynosic rayon, and synthetic fiber to produce the separator paper which includes alkali proof cellulose fiber falling within 10 to 50 weight %, and has a beating degree with said alkali proof cellulose fiber falling within a 500 to 0 ml range of the CSF (Canadian Standard Freeness) value. A separator paper for the alkaline-battery is also disclosed in the Japanese Patent Laid-Open Publication No.62-154559, in which part or all of the fibers which form the separator paper is the synthetic fiber having the fineness of less than 0.8 denier (d) instead of the fiber of a larger fineness of 1 to 3 denier (d) used in the prior art.

Furthermore, another separator paper is disclosed in the Japanese Patent Laid-Open Publication No.5-74439. The separator paper disclosed in it is made by beating polynosic rayon fiber into CSF 300 to 700 ml and interweaving with vinylonfiber of less than 0.4 denier (d) in fineness.

These separator papers made by interweaving the cellulose fibers and synthetic fibers, have sufficient durability against electrolyte and desulphation agents, but have hole diameters which are insufficiently large in regards to protecting internal shortages of the cell, caused by contacting between both electrodes of the active materials. It is therefore required to take measures such as, to laminate the paper in layers in order to make the hole diameter substantially small, or to overlap the paper with some separator material such as cellophane film which has microscopic holes.

Measures have been taken in the alkaline-battery using zinc as a cathode active material, in which the surfaces of zinc particles are amalgamated with mercury to convert it into an active material, in order to prevent self discharging of the cathode and to promote an electromotive force reaction. Recently, in regards to preventing the ecological disruption caused by mercury contamination, the required amount of mercury consumption is being gradually decreased. That is, no mercury can be used with the battery, this has been a prerequisite since 1992.

If no mercury is added, corrosion of zinc as the cathode active material is apt to occur. This results in the deposition of an electrically-conductive crystal zinc oxide compound called "dendrite", which makes electrical contacts between both electrodes of the active materials to cause an internal shortage, and significantly reduces the battery capacity. To prevent such internal shortage caused by the deposition of zinc oxide dendrite, a fine separator paper is required which has a smaller sized hole diameter than that of conventional paper. More specifically, it requires such separator paper to have more than 2 sec/100 ml airtightness, in order to prevent the internal shortage caused by the deposition of zinc oxide.

On the other hand, alkaline-batteries, more specifically alkaline manganese batteries have gained a wide variety of uses for portable electrical power supply, as well as with its progress toward non-mercury type development of cathode, and its increasing application; It is also required to improve battery performance, such as more extended discharging time in the form of continuous or intermittent discharging, and above all, heavy discharging performance.

As portable electronic devices, such as notebook type personal computers, liquid crystal display TV sets, and cellular phones, come into wide use, the demand for the alkaline manganese battery as the power source of these electric devices, (in which heavy discharging is required) is rapidly increased, and so, improvement of the heavy discharging performance is strongly requested. Such conventional electric devices require a large consumption of electricity, so it is common to use a secondary battery such as nickel-cadmium battery for these electronic devices. The application of the alkaline manganese battery takes notice, while electronic devices requiring heavy discharge from alkaline manganese batteries are also increasing, since it is easily available and simple to handle, along with saving power in electronic devices becoming more common. The heavy discharge mentioned above may be defined as a concept event wherein a high current discharge occurs with the load resistance being less than 3Ω.

Under the heavy discharge, however, a higher electric discharge current occurs compared with under a light load of more than 10 Ω resistance, as for the alkaline manganese battery which is an inside-out type structure, wherein battery reaction hardly occurs at the inner region of the active material, as the electric discharge current increases, the utilizing ratio of the active material becomes exponentially reduced, which results in reducing battery capacity thereof. For example, it is known that the utilizing ratio of the active material with a 2 Ω resistance load, which produces heavy discharge, is simply decreased to less than 20%. For this reason, it is said to be a significant improvement for 1 or 2 minutes of extended discharge time, if it is realized with less than 3 Ω of resistance load, and such is of course a desirable improvement and is strongly demanded. To increase the battery capacity under such heavy discharge, increment of active material or decrement of electrical resistance value is not effective. Instead, it is desirable to increase the amount of liquid impregnate properties for the electrolyte in the separator or the active material, so as to encourage the diffusion of ions due to rapid battery reaction. That is, more of the electrolyte should be given to the separator paper, in order to encourage the diffusion of zinc ions of cathode and not to lower the conductivity. More specifically, a separator paper having more than 550% of liquid impregnate ratio is desirable, in regards to the increase of the heavy discharge capacity.

It is, however, difficult to satisfy simultaneously both of the aforementioned requests of airtightness and the liquid impregnate ratio. That is, although part of the electrolyte retained in the separator within the battery may have been moved toward the anode active material and toward the cathode side (during its discharge), the sufficient amount of the electrolyte for its needs should still remain in the fiber portion of the separator, in order to keep the electromotive reaction. Physically, the more porous the design of the separator paper, the more advantageous for the liquid impregnate properties for temporarily holding the electrolyte. However, in regards to preventing shortage in the separation of both electrodes, it is desirable that the paper be densely fabricated. Generally, as the denseness of the paper increases, so the electrical resistance increases, and the liquid impregnate properties also decreases, these result in degrading the discharging properties of the battery. Therefore, such a separator paper is not currently provided which has an increased liquid impregnate property of the electrolyte, such that it is prevented from internal shortage due to the zinc oxide dendrite, accompanied by not adding mercury, and is suitable for heavy discharge, specifically which has an airtightness of more than 2 sec/100 ml, and at the same time which has more than 550% of liquid impregnate ratio.

The present applicant has examined the change of physical characteristics such as, the beating degree and the liquid impregnate ratio, airtightness, etc. of a separator paper provided by a certain degree of beating of mercerized hardwood pulp and polynosic rayon fiber. As for examples concerning its purpose, and to know more specifically the relation between the properties of the aforementioned airtightness and liquid impregnate of a conventional separator paper.

Experimental Example 1

63 weight % of the mercerized hardwood pulp of plural beating degrees ranging from CSF 710 ml (unbeaten) to CSF 200 ml, and 25 weight % of the vinylon fibers (fineness 0.5 d×fiber length 2 mm), 12 weight % of the polyvinylalcohol fibers (fineness 1 d×fiber length 3 mm) are mixed to provide a furnish, which is then carried onto cylinder paper machines to provide a single layer of separator paper of approximately 32 g/m$^2$ in weight and size. The relation between the CSF values of the separator paper, the airtightness and liquid impregnate ratio is shown in Table 9.

TABLE 9

| Experimental Example | Beating Degree of Cellulose Fibers CSF (ml) | Basis Weight g/m$^2$ | Thickness μm | Tensile Strength kg/15 mm | Airtightness Sec/100 ml | Liquid Impregnate Ratio % | Liquid Aspiration mm | Expanded Thickness μm |
|---|---|---|---|---|---|---|---|---|
| 1-1 | 710(unbeaten) | 32.2 | 120 | 3.3 | 1.0 | 480 | 32 | 131 |
| 1-2 | 640 | 32.6 | 111 | 3.5 | 1.7 | 420 | 27 | 121 |
| 1-3 | 550 | 32.1 | 100 | 3.8 | 2.8 | 380 | 26 | 114 |
| 1-4 | 430 | 33.0 | 96 | 4.0 | 5.5 | 340 | 23 | 101 |
| 1-5 | 320 | 32.5 | 89 | 4.1 | 10.5 | 320 | 19 | 95 |
| 1-6 | 200 | 33.0 | 84 | 4.2 | 25.6 | 310 | 19 | 90 |

<<Mercerized hardwood pulp 63 weight % + Vinylon fibers (0.5 d × 2 mm) 25 weight % + Polyvinylalcohol fibers (1 d × 3 mm) 12 weight %>>

Experimental Example 2

63 weight % of the polynosic rayon fibers (fineness 0.5 d×fiber length 2 mm) of plural beating degrees ranging from CSF 740 ml (unbeaten) to CSF 210 ml, and 25 weight % of the vinylonfibers (fineness 0.5 d×fiber length 2 mm), 12 weight % of the polyvinylalcohol fibers (fineness 1 d×fiber length 3 mm) are mixed together to provide a furnish, which is then carried onto cylinder paper machines to provide a single layer of separator paper of approximately 32 g/m$^2$ in weight and size. The relation between the CSF values of the separator paper and the airtightness and liquid impregnate ratio is shown in Table 10.

TABLE 10

| Experimental Example | Beating Degree of Cellulose Fibers CSF (ml) | Basis Weight g/m$^2$ | Thickness μm | Tensile Strength kg/15 mm | Airtightness Sec/100 ml | Liquid Impregnate Ratio % | Liquid Aspiration mm | Expanded Thickness μm |
|---|---|---|---|---|---|---|---|---|
| 2-1 | 740(unbeaten) | 32.2 | 128 | 4.0 | 0.7 | 770 | 53 | 205 |
| 2-2 | 110 | 31.8 | 118 | 4.2 | 0.8 | 610 | 50 | 180 |
| 2-3 | 670 | 33.0 | 108 | 4.3 | 1.1 | 600 | 45 | 162 |
| 2-4 | 600 | 32.1 | 102 | 4.5 | 1.7 | 540 | 40 | 150 |
| 2-5 | 530 | 32.0 | 98 | 4.6 | 2.2 | 470 | 38 | 130 |
| 2-6 | 440 | 31.7 | 95 | 4.8 | 3.4 | 420 | 35 | 121 |
| 2-7 | 330 | 32.2 | 92 | 5.0 | 5.6 | 380 | 33 | 110 |
| 2-8 | 210 | 32.4 | 90 | 5.0 | 10.5 | 350 | 32 | 105 |

<<Polynosicrayon fibers (0.5 d × 2 mm) 63 weight % + Vinylon fibers (0.5 d × 2 mm) 25 weight % + Polyvinylalcohol fibers (1 d × 3 mm) 12 weight %>>

Also, the relations between the CSF values of the separator paper and the airtightness, and the CSF values and the liquid impregnate ratio related to the experimental examples 1 and 2 shown in Table 9 and 10 is graphically shown in FIG. 4. The airtightness and the liquid impregnate ratio for the CSF of the separator papers listed in Table 9 and 10 are graphically shown in FIG. 4, in which symbols ▲ and ● indicate measurements of the experimental examples 1 and 2 respectively.

As is clearly seen from the experimental examples 1 and 2, the separator paper allows its airtightness to increase as the beating degree of the cellulose fibers which are applicable for beating, such as mercerized hardwood pulp, polynosic rayon fiber, etc. proceeds. That is, the sepapator paper having the increased airtightness and the increased denseness is provided. The paper, however, rapidly decreases its liquid impregnate ratio of the electrolyte as the beating proceeds, and it becomes difficult to attain more than 550% of the liquid impregnate ratio, even though the fineness of 2 sec/100 ml is provided. The experimental example 1-3 shows an airtightness of 2.8 sec/100 ml respectively, but shows only 380% of the liquid impregnate ratio, and the experimental example 2-5 shows an airtightness of 2.2 sec/100 ml respectively, but shows only 470% of the liquid impregnate ratio, which can hardly retain the electrolyte to improve the heavy discharging capacity. On the other hand, if more than 550% of the liquid impregnate ratio are given, then the denseness of the paper decreases, so that it is difficult to realize more than 2 sec/100 ml of airtightness. The experimental example 2-3 shows, for example, 600% of the liquid impregnate ratio, but shows the airtightness of only 1.1 sec/100 ml which is insufficient to effectively prevent such an internal shortage due to zinc oxide dendrite. This phenomenon is clearly shown in the graph in FIG. 4, in which every liquid impregnate ratio realizing more than 2 sec/100 ml of the airtightness is less than 500%. Therefore, the conventional separator paper could not realize the sufficient liquid impregnate property suitable for heavy discharging in order to prevent internal shortage due to zinc oxide dendrite accompanied by not adding mercury.

To increase the airtightness, the conventional separator paper is required to increase the number of winding so that the diameter of the holes in the paper is effectively decreased, or to make smaller the diameter of the synthetic fibers comprising the paper such as vinylon fibers. Furthermore the separator paper such as disclosed in the Japanese Patent Laid-Open Publication No.2-119049, or No.5-74439 is used.

However, increasing further the number of winging of the separator paper results in the volume of the separator within the battery to be increased, which in turn decreases the volume of the active material, therefore the battery capacity is inevitably decreased. Also, using synthetic fiber of a smaller fineness, that is, synthetic fiber having a smaller diameter makes the denseness of the resulting sheet to be higher. However, fibers comprising the paper are bonded together by thermal fusion or binder so that the smaller the diameter of the synthetic fiber, the larger the binding area is taken, resulting in the liquid impregnate ratio of the paper to be easily decreased. Adding to that, the synthetic fiber of small fineness such as less than 0.4 d is expensive, which results in the cost of the paper to increase.

Furthermore, Japanese Patent Laid-Open Publication No.2-119049 and Laid-Open Publication No.5-74439 disclose the art in which cellulose fibers are fibrillated by beating and fine branches are separated from fiber bodies to fabricate dense separator paper therewith. However, the cellulose tissues within such cellulose fiber are cut and so on at an early stage of the beating, where most of the CSF is not yet lowered. That is, even though the fibers do not show any change, the internal tissues of the fibers have inevitably suffered damage from the beating. Thusly, the stiffness of it has been lowered if compared with than that of unbeaten cellulose, such as more than CSF 700 ml or its equivalent of the similar beating degree. Thus, the cellulose fibers are softened, then the paper fabricated with it will have a high denseness, which will suppress the fibers of the paper in the electrolyte to expand, and which would cause the liquid impregnate ratio of the paper to rapidly decrease in accordance with the degree of the beating.

Therefore, in the battery using a separator paper densely fabricated with highly beaten cellulose fibers, the quantity of the electrolyte, impregnated in the paper is inevitably decreased, which causes the expansion of the ions needed in discharging the battery to suppress, but this decrease of the electrolyte in the paper does not cause any significant problem in discharging the battery as long as the discharge occurs through the light load having resistance of 10Ω, for example. However, during the heavy discharging by a large current, such as with a constant value of 1 A or through the resistance of 2 Ω, the utilizing ratio of the active materials of the battery are decreased, which causes the lifetime of the battery to shorten so that, in the actual circumstances, it cannot respond to today's demand for improving the heavy discharging capacity of the alkaline-battery.

While the electrolyte impregnation can be increased and can make the separator more satisfactory for heavy discharging, by reducing the beating of the cellulose fibers, the denseness of the separator decreases, which in turn has an effect on the zinc oxide dendrite and furthermore decreases preventive effect of the internal shortage due to the migration of both electrodes of the active materials, and results in shortening the lifetime of the battery.

Furthermore, in regards to preventing internal shortages, which are caused by such as zinc oxide dendrite deposition, these could be sufficiently prevented by using the separator material, such as a cellophane film having a number of microscopic holes, and a porous separator paper, overlapping each other. However, the cellophane film has an airtightness of more than 10,000 sec/100 ml, but this value is an excessive one, resulting in the expansion of ions being suppressed, thus the film is not adequate for use with heavy discharging.

In considering the problems of the prior art mentioned above, the object of the present invention is to provide a separator paper for alkaline-battery which has a suitable denseness in preventing internal shortages caused by deposition of zinc oxide dendrite and the like in the trend of not using mercury, and which satisfies an improved liquid impregnate property of electrolyte which can support heavy discharging as well. More specifically, it is to provide a separator paper which has the airtightness in the range of 2 sec/100 ml to 100 sec/100 ml as for the denseness, and more than 550% of the liquid impregnate ratio for its liquid impregnate property.

SUMMARY OF THE INVENTION

In order to solve these tasks, the present invention provides a separator paper for electrically isolating an anode active material and a cathode active material of an alkaline-battery, wherein said separator paper may include a dense layer for keeping its fineness. This prevents electrical internal shortages of said two active materials, and a liquid impregnate layer for increasing the liquid impregnate ratio of the electrolyte within the battery, said dense layer and said liquid impregnate layer being integrally laminated.

Further, said separator paper may include a dense layer having a certain degree of denseness, and a liquid impregnate layer having a certain degree of liquid impregnate ratio, said dense layer and said liquid impregnate layer being integrally laminated, and said dense layer preventing internal shortage from occurring due to any deposition of zinc oxide dendrite, and said liquid impregnate layer effecting to increase said liquid impregnate ratio such that the battery is adapted to heavy discharging.

Still further, said separator paper may include a dense layer having a certain degree of fineness, and a liquid impregnate layer having a certain degree of liquid impregnate properties, said dense layer being made by mixing alkali proof cellulose fibers which are applicable for beating with synthetic fibers, such that said alkali proof cellulose fibers which are applicable for beating may be included in the range of 20 to 80 weight % with the beating degree of 500 ml do to 0 ml at CSF value, and said liquid impregnate layers may be made by mixing alkali proof cellulose fibers with synthetic fibers, and said alkali proof cellulose fibers may be included in the range of 20 to 80 weight % with the beating degree of more than 700 ml at CSF value.

Still further, said alkali proof cellulose fibers which are used for the dense layer and are applicable for beating may have the beating degree of 300 to 10 ml at CSF value.

Still further, said alkali proof cellulose fibers which are used for the liquid impregnate layer may have the beating degree of unbeaten.

Still further, said alkali proof cellulose fibers which are used for the dense layer and are applicable for beating may include one or more kinds of pulp or fibers selected from mercerized wood pulp, linter pulp, polynosic rayon fiber, organic solvent forming rayon fiber, and prehydride pulp.

Still further, said alkali proof cellulose fibers may include regenerated fibers having a fiber length of 2–10 mm.

Still further, said synthetic fibers used for said dense layer and said liquid impregnate layer may include one or more kinds of synthetic fibers having a high degree of alkali proof properties.

Still further, said synthetic fibers having said high degree of alkali proof properties may include one or more kinds of pulp or fibers selected from polypropylene fibers, polyethylene fibers, polyamide fibers, viylon fibers, polyvinylalcohol fibers, polypropylene-polyethylene compound fibers, polypropylene-ethylenevinylalcohol copolymer fibers, polyamide-denaturation polyamide compound fibers, polypropylene-synthetic pulp, and polyethylene-synthetic pulp.

Still further, said paper may include either one of polyvinylalcohol fibers or polyvinylalcohol powder to be added as binder with 5 to 20 weight % relative to the whole weight of the separator paper laminated by said dense layer and said liquid impregnate layer.

Still further, said dense layer may have said liquid impregnate layer integrally laminated on one or both sides thereof.

Still further, said dense layer may have a basic weight of less than 50%, in relation to the whole basic weight of the paper, and said basic weight is of more than 5 g/m².

Still further, said paper may have an airtightness in the range of 2 sec/100 ml to 100 sec/100 ml, and the liquid impregnate ratio of more than 550%.

Still further, said paper may have an airtightness in the range of 2 sec/100 ml to 100 sec/100 ml, and the liquid impregnate ratio of more than 600%.

According to the present invention, said dense layer which has the denseness and said liquid impregnate layer which has the liquid impregnate property may be integrally laminated, whereby said dense layer may provide a required denseness suitable for preventing active materials of both electrodes or zinc oxide dendrite from migration, and also said liquid impregnate layer may provide a required liquid impregnate ratio of the electrolyte even at the heavy discharging of the battery. That is, said dense layer may provide more denseness, and said liquid impregnate layer may provide a more suitable property for impregnating the electrolyte than those of the prior art which only have a single layered separator paper.

Also, said liquid impregnate layer may expand in the electrolyte for impregnating the required quantity of the electrolyte at the heavy discharging of the battery, but dense layers including beaten cellulose fibers may exhibit less thickness expansion in the electrolyte than that of the liquid impregnate layer. That is, the diametric expansion of the holes of the dense layer accompanied by the expansion in the electrolyte becomes small, and the denseness of the separator in the electrolyte is hardly effected, even though the liquid impregnate ratio is increased by laminating the dense layer and the liquid impregnate layer.

Therefore, the separator paper according to the present invention can be provided, which have the denseness and the increased liquid impregnate ratio of the electrolyte, that is, which simultaneously satisfy the denseness that allows the prevention of internal shortage due to the deposition of the zinc oxide dendrite accompanied by not adding mercury, and the liquid impregnate properties that allow the increase of the heavy discharging properties of the battery.

Furthermore, the present invention can provide an improved separator paper which can contribute to increased reliability in preventing an internal shortage, since, by laminating more than two layers, pin hole portions and bubbles in the separator paper produced in the course of paper making, which are comparatively large, are made substantially smaller, and variations in the sizes of the diameters of the holes are also lowered, when compared with the separator paper of the prior art, which has only a single layer. In addition, since the porous liquid impregnate layers are laminated, the absorption velocity of the electrolyte is also increased, when compared with the prior art which has only a single layer with the similar airtightness of the present invention, and the injection time of the electrolyte during its assembly stage of the battery can be decreased to contribute to the productivity of the battery.

BRIEF DESCRIPTION OF THE DRAWINGS

Referring now to the drawings in which like reference numbers represent corresponding parts and wherein.

DETAILED DESCRIPTION OF THE PREFERRED INVENTION

Figure 1:
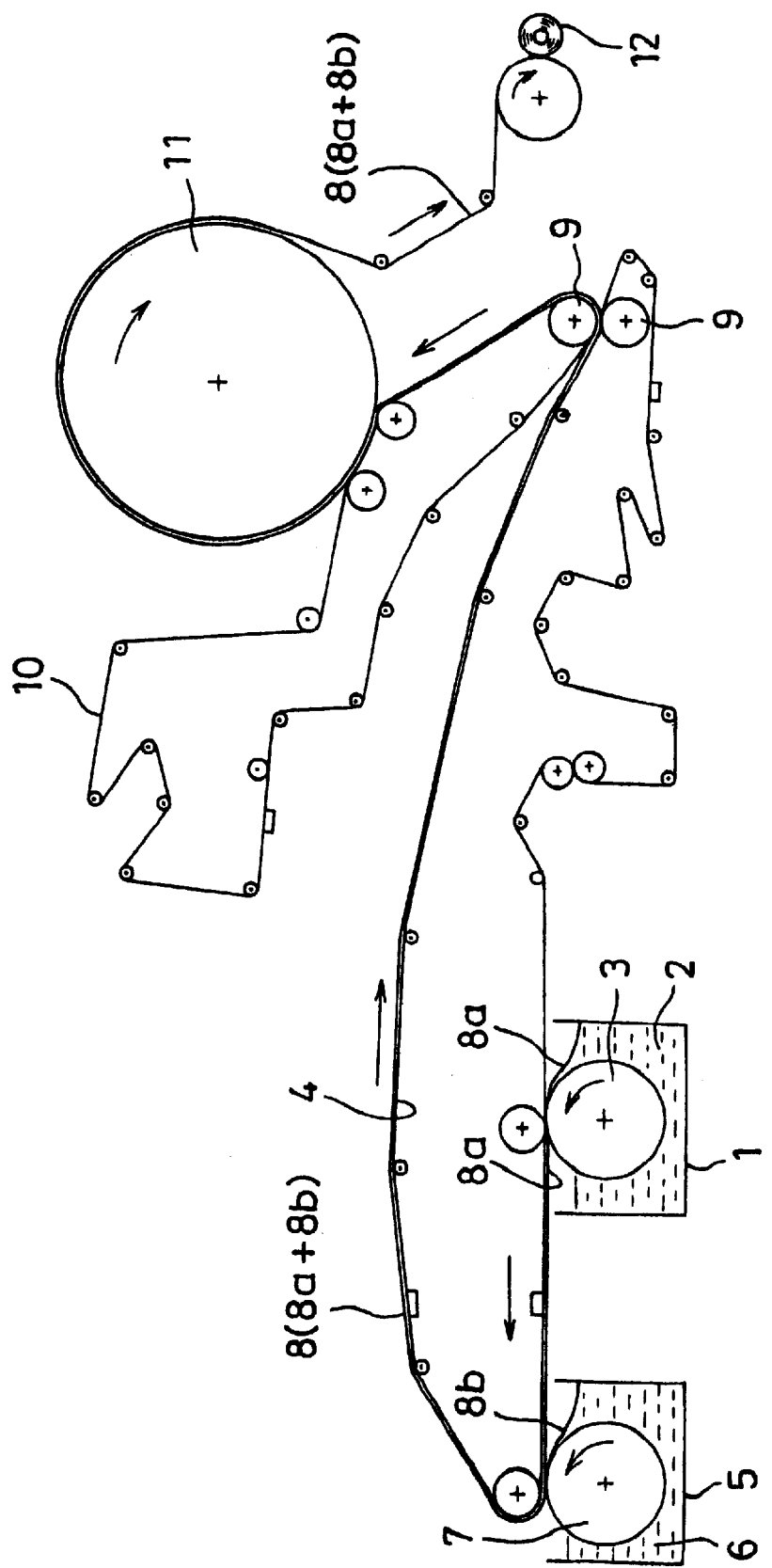
FIG. 1 illustrates the first embodiment of the paper making step of the separator paper according to the present invention.

Now, the preferred embodiments of the separator paper for an alkaline-battery according to the present invention will be described. The present invention is characterized in that the separator paper for electrically isolating an anode active material and a cathode active material is integrally laminated with a dense layer which maintains denseness for preventing internal shortage of said anode active material and said cathode active material, and a liquid impregnate layer for increasing the liquid impregnate ratio of the electrolyte, to increase the liquid impregnate ratio of the electrolyte to be suitable for the heavy discharging of the battery, as well as to prevent internal shortage of the battery due to depositions of the zinc oxide dendrite by said dense layer.

The inventors of the present invention have investigated the relations between the degree of the beating of the cellulose fiber shown in Tables 9 and 10 indicated above and the physical properties as the separator paper, and concluded that it was difficult with the separator paper of a single layer of the prior art to satisfy both the denseness and the liquid impregnate properties suitable for the heavy discharge.

The inventors have, however, an idea to integrally laminate the first layer, which has a high CSF value for increasing the liquid impregnate properties, that is, which includes cellulose fibers of a low degree of beating, and a second layer which has a low CSF value for maintaining the denseness, that is, which includes cellulose fibers of a high degree of beating, and thus invented a separator paper for the alkaline-battery, which has the; denseness and the increased liquid impregnate ratio of the electrolyte, that is, which simultaneously satisfies the denseness that allows to prevent the internal shortage due to the deposition of the zinc oxide dendrite accompanied by not adding mercury, and the liquid impregnate ratio of the electrolyte that allow an increase in the heavy discharging properties of the battery.

Therefore, for the dense layer, fibers applicable for beating are selected from alkali proof cellulose fibers, and then said alkali proof cellulose fibers applicable for beating are mixed with synthetic fibers to provide pulp which includes said alkali proof cellulose fibers for beating in the range of 20–80 weight %, and the degree of beating for said alkali proof cellulose fibers for beating is in the range of 500–0 ml at the CSF value (Canadian Standard Freeness).

On the other hand, for the liquid impregnate layer, the alkali proof cellulose fibers and the synthetic fibers are mixed together to provide pulp which includes said alkali proof cellulose fibers in the range of 20–80 weight %, and the degree of beating for said alkali proof cellulose fibers is unbeaten or more than 700 ml at CSF value. The alkali proof cellulose fibers used for the liquid impregnate layer are not processed for fibrillation in order to avoid damages to the fibers and to maintain the liquid impregnate properties. That is, any fibers which are available can be used, which are substantially unbeaten and have an excellent liquid impregnate property and which do not require any restriction, whether or not the fibers are applicable for beating, unless the fibers already have the alkali proof properties. Therefore, the fibers may be selected from cellulose fibers which are applicable for beating, such as polynosic rayon fiber, or from cellulose fibers which are hard for beating, such as the conventional viscose rayon fibers.

Said dense layer having the arrangement described above and the liquid impregnate layer are integrally laminated together to produce the separator paper. As for the method of integrally laminating the layers, the method at the paper making stage, using a paper making machine, is preferable since it is simple in regards to manufacturing steps, and the number of required steps are a few so that the required costs are lowered. It should be noted that the dense layer and the liquid impregnate layer may be made separately, and can then be laminated.

As for the alkali proof cellulose fibers used for the dense layer and the liquid impregnate layer, fibers which are most preferable have excellent alkali proof properties, and do not dissolute or shrink excessively into or in the electrolyte. As for such fibers, mercerized wood pulp is preferable, which is provided by natural cellulose fibers with cooled alkali treatment, and which may include softwood pulp, hardwood pulp, esparto pulp, Manila hemp pulp, and sisal hemp pulp. Particularly, mercerized wood pulp including hardwood pulp, and esparto pulp are preferable since these pulp include fibers which have small diameters that provide a high airtightness. Also, fibers having more than 97% of a high α-cellulose, such as linter pulp, pre-halide pulp which is cooked by pre-hydrolysis cooking and then steaming, have excellent alkali proof properties, and can be used without mercerization. Furthermore, regenerated cellulose, such as conventional rayon fibers, polynosic rayon fibers, and organic solvent forming rayon fibers have excellent alkali proof properties, so they are also suitable for the alkali proof cellulose fibers.

Evaluation of the alkali proof properties for these alkali proof cellulose fibers was performed by adding the weight 10% of polyvinylalcohol fiber as a binder, into the weight 90% of cellulose fibers, and these fibers were made into the shape of a sheet by paper making machines, which were then dipped into 40% of KOH aqueous solution at a temperature of 60 ° C. for 24 hours, and finally brought to measurements for reduction of the area of the paper. The results of the measurements indicated that the reduction of the area was less than 15%, indicating that the fibers, according to the present invention, have less shrinkage. Therefore, the fibers have an excellent alkaline proof properties when compared with approximately 30% shrinkage of the cellulose fibers of conventional wood pulp, such as NUKP.

Among the alkali proof cellulose fibers applicable for beating and for making the dense layer, fibers which, by beating rapidly decrease the CSF value producing fine branches, such as mercerized wood pulp, linter pulp, polynosic rayon fiber organic solvent forming rayon fiber, and pre-hydride pulp which is the trade mark of Polosania NBKP available from Rayonia Co. in the USA, are preferable.

Also, as alkali proof cellulose fibers used for the liquid impregnate layer, alkali proof cellulose fibers which are applicable for beating similarly as the dense layer explained above can be used, and more specifically, regenerated cellulose fibers that exhibit a satisfactory stiffness with the fiber length 2–10 mm are most preferable since the liquid impregnate properties are improved. However, fibers which have the fiber length of less than 2 mm, are not preferable, since they cause the denseness of the liquid impregnate layer to increase excessively, which in turn reduces the expansion of the liquid impregnate layer resulting in reducing the liquid impregnate properties. On the other hand, cellulose fibers which have the fiber length of more than 10 mm, provide a porous liquid impregnate layer which has excellent liquid impregnate properties, but these long fibers are difficult to dissolve in the water, that is, difficult for paper making. And if the paper is made, the basis weight varies widely. So that these fibers are not suitable for making the separator paper.

The contents of alkali-proof cellulose fiber for both of the dense layer and Do the liquid impregnate layer, should be in the range of 20–80 weight %. Fibers, which have the contents of the alkali-proof cellulose fiber with more than 80 weight %, provide separator papers of a high density, but the content ratio of the synthetic fibers, which are to be mixed with the cellulose fibers, are correspondingly decreased, resulting in the shrinkage of the paper in the electrolyte to be excessively large, which is not desirable for separator paper. For the fibers which have the contents of the alkali-proof cellulose fibers with less than 20 weight %, the resulting separator paper has insufficient liquid impregnate properties of the electrolyte, which is not suitable for the heavy discharging. The cellulose fibers of the dense layer may have the beating degree of less than 200 ml CSF, that is, may have large beating degree so as to provide finer fibers, but the contents less than 20 weight % are too small to prevent the internal shortage sufficiently, since the separator paper will lack in denseness.

Note that if either the dense layer or the liquid impregnate layer is made only by the cellulose fibers, then a higher density or liquid impregnate property can be given to the paper, but the shrinkage of it is significantly larger, and tends to curl up due to the environmental humidity of the air, which causes difficulty when working with the paper. Thus, to make separator paper from such fibers is not suitable. According to this invention, the contents of the alkali-proof cellulose fiber are selected to be fall within 20–80 weight % for both of the dense layers and the liquid impregnate layer.

The beating degree of the alkali-proof cellulose fiber for the dense layer is selected to be in the range of 500–0 ml CSF, more preferably in the range of 300–10 ml. The alkali-proof cellulose fibers, which exceed 500 ml CSF, are not sufficient in fibrillation of the fibers in regard to the dense layer, and the fibers can only provide the separator paper of a low denseness and airtightness which is similar to the prior art. If the beating degree of the cellulose fibers for the dense layer is increased, then the dense layer can be made thinner in thickness which allows the thickness of the liquid impregnate layer to be correspondingly increased, and the separator paper of a high liquid impregnate ratio can be attained. If the beating degree of the cellulose fibers for the dense layer is increased, and excessive beating is applied to the cellulose fibers which have already reached to the 0 ml CSF, then the cellulose fibers tend to overflow from the wire mesh significantly, which undesirably degrades the yield rate of the paper. In order to increase the liquid impregnate ratio, it is required to increase the basis weight of the liquid impregnate layer, which in turn correspondingly decreases the basis weight of the dense layer. In order to increase the denseness of the dense layer, and to increase the basis weight of the liquid impregnate layer, the CSF of the cellulose fibers for the dense layer is preferably selected to be less than 300 ml. On the other hand, it is desirable to limit the CSF to approximately 10 ml in order to prevent an excessive beating. Thus, 300–10 ml CSF is preferable for the cellulose fibers of the dense layer.

The beating of the alkali-proof cellulose fiber for the liquid impregnate layer is selected to 'unbeaten' or a certain degree of beating which do not substantially damage the fibers, but which is suitable for the liquid impregnation of the electrolyte. More specifically, a beating of more than 700 ml is selected by CSF value. For less than 700 ml of the CSF, the liquid impregnate ratio remains at the prior art level so that the liquid impregnate ratio of more than 550%, which allows the heavy discharging properties of the alkaline-battery to increase, cannot be attained. In the course of beating, cuttings of fiber structure and so forth occur inside of the cellulose fibers at the initial stage of beating where CSF is not yet lowered, and the fibers suffer damages caused by the beating, and rapidly lose their stiffness even though no external changes of the fibers are found. Therefore, the denseness of the separator paper thus produced tends to increase since the cellulose fibers are softer, and the liquid impregnate ratio of the electrolyte of the separator paper thus attained decreases rapidly as the beating proceeds since the expansion of the separator paper in the electrolyte is suppressed. Therefore, for the liquid impregnate layer to increase the liquid impregnate properties, a beating rate of more than 700 ml CSF, or unbeaten or its equivalent is required.

For synthetic fibers which are mixed with the alkali-proof cellulose fibers to be used for both the dense layer and the liquid impregnate layer, one or more kinds of fibers are used which are excellent for alkali-proof properties, such as, synthetic fibers which include polypropylene fibers, polyethrene fibers, polyamide fibers, vinylon fibers, and polyvinylalcohol fibers; and compound fibers which include polypropylene-polyethylene compound fibers, polypropylene- ethylenevinylalcohol copolymer compound fibers (such as UBF fibers, commercially available from Daiwa Spinning Co.), and polyamide-denaturation polyamide compound fibers (such as Unimelt fiber UL 60 commercially available from Unitika Co.); and compound pulp which include polypropylene-compound pulp and polyethrene compound pulp.

Among these synthetic fibers, compound fibers mean polypropylene fibers, for example, to surfaces of which synthetic plastics of lower melting point are bonded, and components of the lower melting point are softened and stick together when heated by the drier of the paper making machine. These fibers are preferable since a separator paper of sufficient strength can be provided simply by mixing cellulose fibers at the paper making stage.

Also, polyvinylalcohol fibers are, at the paper making stage, melted by the moisture included in the wetted paper when the fibers are heated more than 50° C. by the dryer of the paper making machine, and bonded together when dried. Polyvinylalcohol fibers are preferable, since the fibers provide the separator paper of sufficient strength by adding and mixing with other synthetic fibers even though the quantity of the additive is less than 10%, and are specifically preferable to be used combined with other synthetic fibers.

The synthetic pulp is made by fibrillation of such as synthetic resin using the flash spinning method, and includes materials in the form of pulp having fine branching fibrils. According to the present invention, the denseness of the resulting separator paper can be increased by mixing with the cellulose fibers beaten for the dense layer.

These synthetic fibers show a weight decrease of less than 2% after immersing the fibers in 40% KOH solution for 24 hours at a temperature of 60° C. indicating that the fibers have excellent alkali proof properties.

According to the present invention, it is preferable to increase the liquid impregnate ratio of the resulting separator paper by using synthetic fibers, which have alkali-proof properties and relatively high hydrophilic properties. Thus, the synthetic fibers that meet specifically with these requirements are, for example, polyamide fibers, vinylon fibers, etc., which have polar proups. They are preferable for providing the separator paper, which is excellent for alkali-proof properties and for strength. In cases where these synthetic fibers, such as polyamide fibers, and vinylon fibers are mixed with the cellulose fibers, polyvinylalcohol fibers or polyvinylalcohol powder (such as Poval UV-2S, which is commercially available from Unitika Co.) are added and mixed as a binder with these synthetic fibers before being carried to a further process of paper making. It is preferable that the quantity of the added binder of these polyvinylalcohol fibers is within a 5–20 weight % in relation to the whole weight of the separator paper which is made by bonding the dense layer and the liquid impregnate layer. When the quantity of the added binder is less than 5 weight %, the intensity of the separator paper is undesirably decreased, and when the quantity exceeds more than 20 weight %, the fibers do not only stick, but also bond to each other in the shape of webs between gaps of the fibers, so that the electric resistance of the paper is undesirably increased, and in turn this suppresses the expansion of the paper, causing a decrease in the resulted liquid impregnate ratio.

It should be noted that the polyvinylalcohol powder does not hold the shape of the fibers, but when the powder is mixed with the cellulose fibers together with other synthetic fibers to make the separator paper, it remains in the produced separator paper after paper making, and the effects are substantially the same as the polyvinylalcohol fibers, so that the present invention handles this as the synthetic fibers.

The synthetic fibers available for the dense layer include not only the fine fibers having less than 1 d in fineness, but also the fibers having a relatively larger diameter of 1–3 d in fineness which is sufficiently available. It is preferable to use finer fibers of less than 1 d in fineness in order to increase denseness of the dense layer. However, according to the present invention, such synthetic fibers that have relatively large diameters of 1–3 d in fineness can also be used sufficiantly for the paper making, since the denseness can be given to the dense layer by mixing cellulose fibers conditioned by beating. However, the fibers of more than 3 d in fineness result in the fibers of approximately 20 μm in diameter, by which it becomes difficult to make thin dense layers and undesirably degrades its denseness.

The fineness of the synthetic fibers used for the liquid impregnate layer is not specifically limited here, but it is preferable to be less than 5 d in fineness. This is because the diameters of the fibers, which have a fineness of more than 5 d, exceed approximately 30 μm in diameter, that is, exceed the suitable size of the diameter in relation to the thickness of the normally used separator paper, which has in the order of 100 μm in diameter, which results in reducing the tensile strength of the separator paper, and also makes it impossible to make the separator paper less than 200 μm in thickness.

Similarly, if the cellulose fibers used for the liquid impregnate layer exceed 30 μm in diameter in diameter, they cannot make the separator paper having a suitable thickness so that the suitable fineness becomes less than 5 d in fineness even if reused cellulose fibers are used.

The structural ratio of the laminated dense layer and the liquid impregnate layer according to the present invention may be suitably selected. Most preferably, the ratio of the dense layer is less than 50% to the whole basis weight, and more than 5 g/m² of basis weight in order to make the liquid impregnate ratio sufficiently larger than the conventional separator paper, and to provide adequate airtightness that is able to prevent internal shortages due to the deposition of the zinc oxide dendrite.

Preferably, the range of the airtightness of the separator paper according to the present invention is 2–100 sec/100 ml. In the past when adding mercury was allowed, the separator paper having the airtightness of less than 1 second airtightness was normally used, but in order to prevent the internal shortage due to deposition of zinc oxide dendrite with today's rule of not adding mercury,only a separator paper having more than 2 sec/100 ml of the airtightness can be used. The diffusion of ions becomes difficult when the separator paper has more than 100 sec/100 ml of airtightness, so that it is not suitable to use for the heavy discharging. Further, for the purpose of increasing the heavy discharging properties of the present invention, it is preferable that the liquid impregnate ratio of the electrolyte is more than 550%, particularly, the airtightness is in the range of 2 sec/100 ml–100 sec/100 ml, and the liquid impregnate ratio of the electrolyte is more than 550%, particularly more than 600%.

Further, the separator paper is required to typically have more than 2 kg/15 mm of tensile strength, by which working the paper is allowed, and no problems occur at the inserting stage of the separator into battery or on manufacturing separator.

Now, a manufacturing method of the separator paper for the alkali battery according to present invention will be described. The manufacturing method of the separator paper for the dense layer is to perform dispersing into water one or two kinds of alkali proof cellulose fibers applicable for beating. Thus beating said fibers to a degree of a predetermined CSF by using the beating equipment used for the paper making machine, such as a beater or double disc refiner, mixing the fibers with one or two kinds of said synthetic fibers, and further mixing it, by adding fibers such as polyvinylalcohol fiber, which is used as a binder if required of increase the strength of the separator paper to provide a furnish which is brought, to paper machines, such as cylinder paper machines, Fourdrinier machines, for making paper using a conventional paper making method.

In addition, the liquid impregnate layer acts similarly to the dense layer, dispersing into water one or two kinds of alkali proof cellulose fibers, mixing one or two kinds of said synthetic fibers to sufficiently dissolve, and then mixing with fibers such as polyvinylalcohol fibers which are used as a binder if required to increase the strength of the separator paper in order to provide a furnish which is brought to paper machines, such as cylinder paper machines or Fourdrinier machines, for making paper using a conventional paper making method. The dense layer and the liquid impregnate layer are then intergally laminated on the paper making machine to provide the separator paper.

Furthermore, in order to ensure the dissolving of the fiber while making the liquid impregnate layer, the dissolving can be accelerated by simply using the beating machine for paper making, such as beater or double disc refiner. However, dissolving of the cellulose fibers significantly decreases the liquid impregnate ratio of the separator paper so that care is required in order to keep more than CSF 700 ml.

Integration of the dense layer and the liquid impregnate layer is performed by laminating the liquid impregnate layer on one or both sides of the dense layer at the paper making stage, using a paper making machine which is able to combine the layers. Alternatively, after making the dense layer and the liquid impregnate layer separately, the latter may be bonded to the one side or both sides of the former by a post processing.

FIG. 1 shows the first embodiment of the paper making step for laminating two layers which integrate the liquid impregnate layers on one side of the dense layer using a cylinder multi-layer paper machine. The furnish 2 mentioned above for the dense layer is contained inside of a cylinder vat 1, and the furnish 6 for the liquid impregnate layers is contained inside of a cylinder vat 5. The furnish 2 for the dense layer contained inside of the cylinder vat 1 is filtered by the mesh of the periphery of a cylinder mould 3 which rotates inside of the cylinder vat 1, and a paper layer 8a of the dense layer is formed, which is extended from the cylinder mould 3. The paper layer 8a of the dense layer thus formed is transferred from said mesh to a wet felt 4. Similarly, the furnish 6 for the liquid impregnate layer contained inside of the cylinder vat 5 is filtered by the mesh of the periphery of a cylinder mould 7 which rotates inside of the cylinder vat 5, and a paper layer 8b of the dense layer is formed, which is extended from the cylinder mould 7. The paper layer 8b thus formed is transferred from said mesh and is overlaid on the paper layer 8a on the wet felt 4 to be laminated as a single laminated paper layer 8 (the paper layer 8a+the paper layer 8b). The paper layer 8 thus laminated is sent to press rolls 9, as the wet felt 4 moves, and excessive moisture contained within the paper layer 8 is removed by pressing and then transferred to a top felt 10. The paper layer 8 on the top felt 10 is carried onto a periphery of a cylindrical drier 11 which is heated by a steam or heat media. The paper layer 8, which is laminated by the paper layer 8a of the dense layer and the paper layer 8b of the liquid impregnate layer, contacts with drier 11 and is dried. After being dried off, it is rolled up into the shape of a roll by a take up reel, and formed into roll paper 12. The roll paper 12 in the shape of a roll is then cut in such a way that it meets with the separator width, for example 45 mm width, in accordance with its intended use and then shipped as goods. A diluted surface active agent is then applied to the roll paper 12 in the shape of the roll, if needed, in order to increase the liquid impregnate properties of the electrolyte.

An aqueous solution of a high viscosity, such as polyethylene oxide or polyacrylamide of a high molecular weight, is now added to the furnish 2 and 6 introduced into the cylinder vats 1 and 5. By adding the aqueous solution of a high viscosity, the moisture dispersion of the furnish is homogenized. Also, by extending the freeness time for the furnish through the mesh, the paper layer is adjustably homogenized so that the variation of the basis weight is reduced when compared with the other known paper making method such as the Fourdrinier paper making method. Therefore, this paper making method is suitable for making the separator paper.

Also, in the first embodiment shown in FIG. 1, the paper layer 8a of the dense layer of the separator paper is put in contact with the surface of the drier 11 and dried. Alternatively, the paper layer 8b of the liquid impregnate layer may be put in contact with the surface of the drier 11 and dried. However, it should be noted that, in making such a separator paper by laminating two layers, the airtightness and the liquid impregnate ratio may take on a different value respectively by either of the layers being put in contact with the surface of the drier. That is, by putting the dense layer in contact with the surface of the drier, a separator paper of higher airtightness may be attained, but by putting the liquid impregnate layer in contact with the surface of the drier, a lower airtightness may be attained than that of the dense layer, but increased liquid impregnate properties are given to the separator paper.

Figure 2:
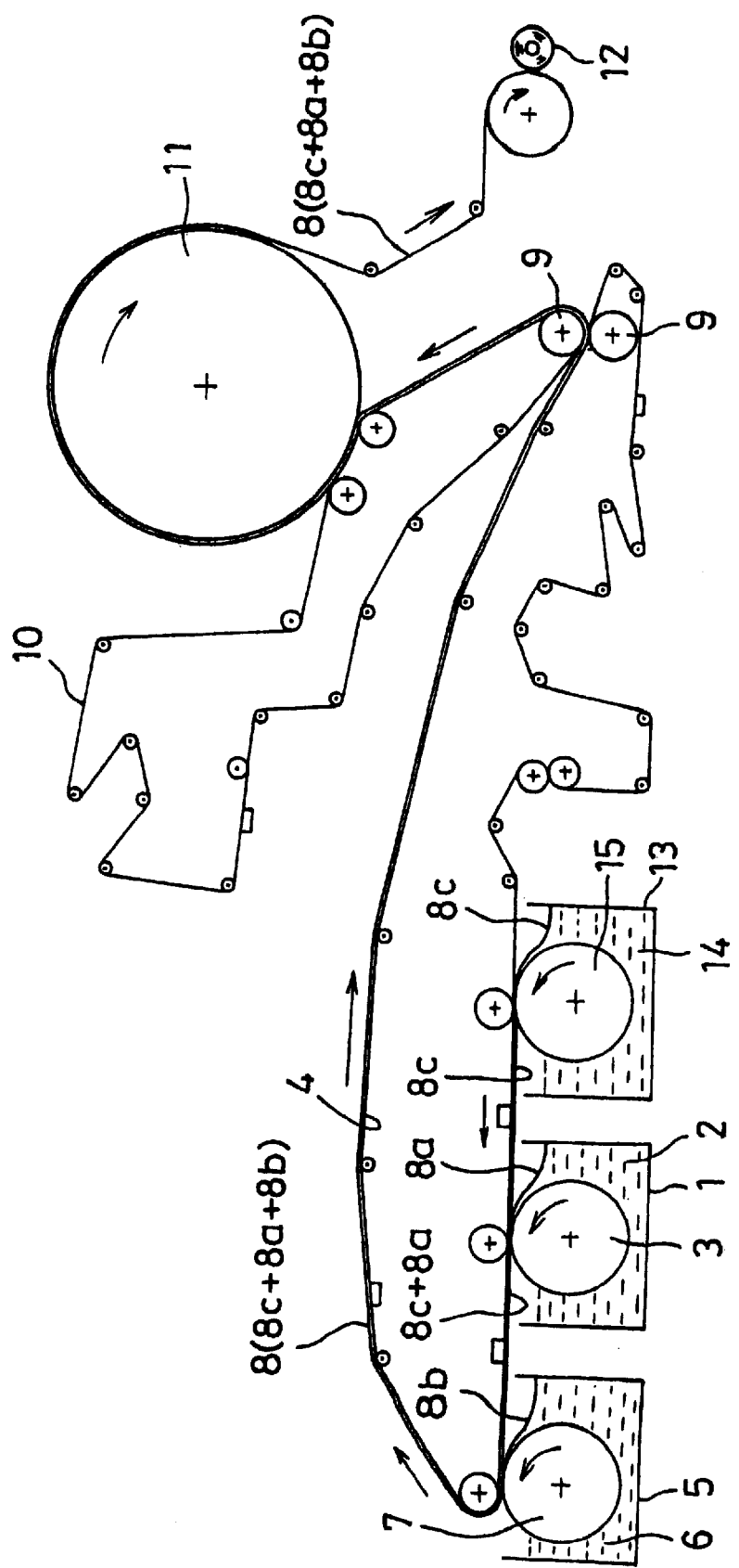
FIG. 2 illustrates the second embodiment of the paper making step of the separator paper according to the present invention.

The second embodiment of the paper making process according to the present invention by using the cylinder multi-layer paper machine for laminating liquid impregnate layers on both sides of the dense layer respectively to provide a three layered integrated paper is next shown in FIG. 2 in which a similar portion with that of the first embodiment shown in FIG. 1 is given the same number and a similar description which is not mentioned here. To attain three layered arrangements, in addition to the arrangement shown in FIG. 1, a furnish 14 for the liquid impregnate layer is contained in a cylinder vat 13 which is positioned upstream of the cylinder vat 1, in which the furnish 2 for the dense layer is contained, such that the cylinder vat 1 is located in mid-position of the vats. The furnish 14 contained in the cylinder vat 13 is filtered on the peripheral mesh of the cylinder mould 15 which is rotating inside of the vat 13, and a paper layer 8c of a continuous liquid impregnate layer is formed on the cylinder mould 15. The paper layer 8c thus formed for the liquid impregnate layer is transferred from the mesh to the wet felt 4. The paper layer 8c carried on the wet felt 4 is then overlaid with the paper layer 8a of a dense layer, on which a paper layer 8b for the liquid impregnate layer is further overlaid to form a laminated layer 8 (i.e. the paper layers 8c+8a+8b), and similar processes follow as described in the first embodiment.

Figure 3:
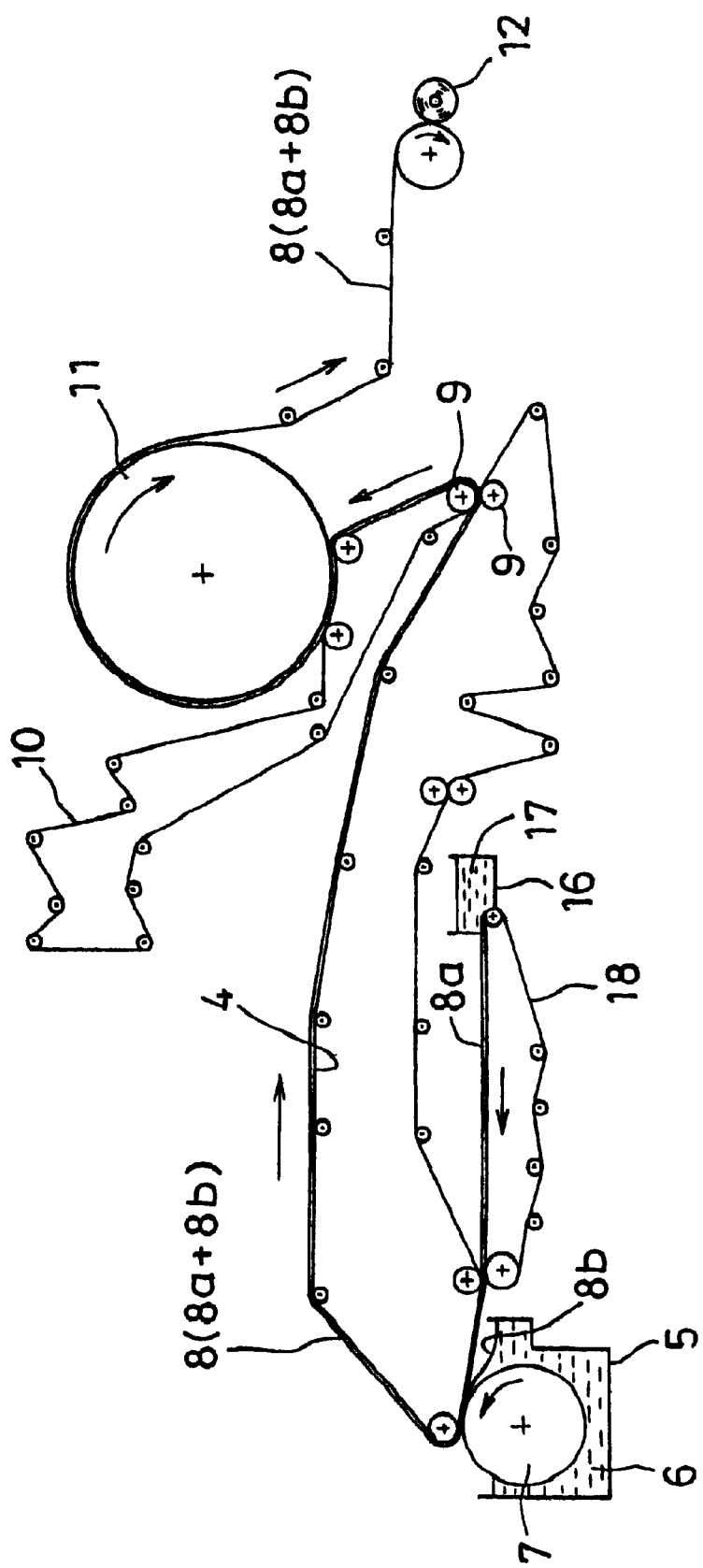
FIG. 3 illustrates the third embodiment of the paper, making step of the separator paper according to the present invention.
Figure 4:
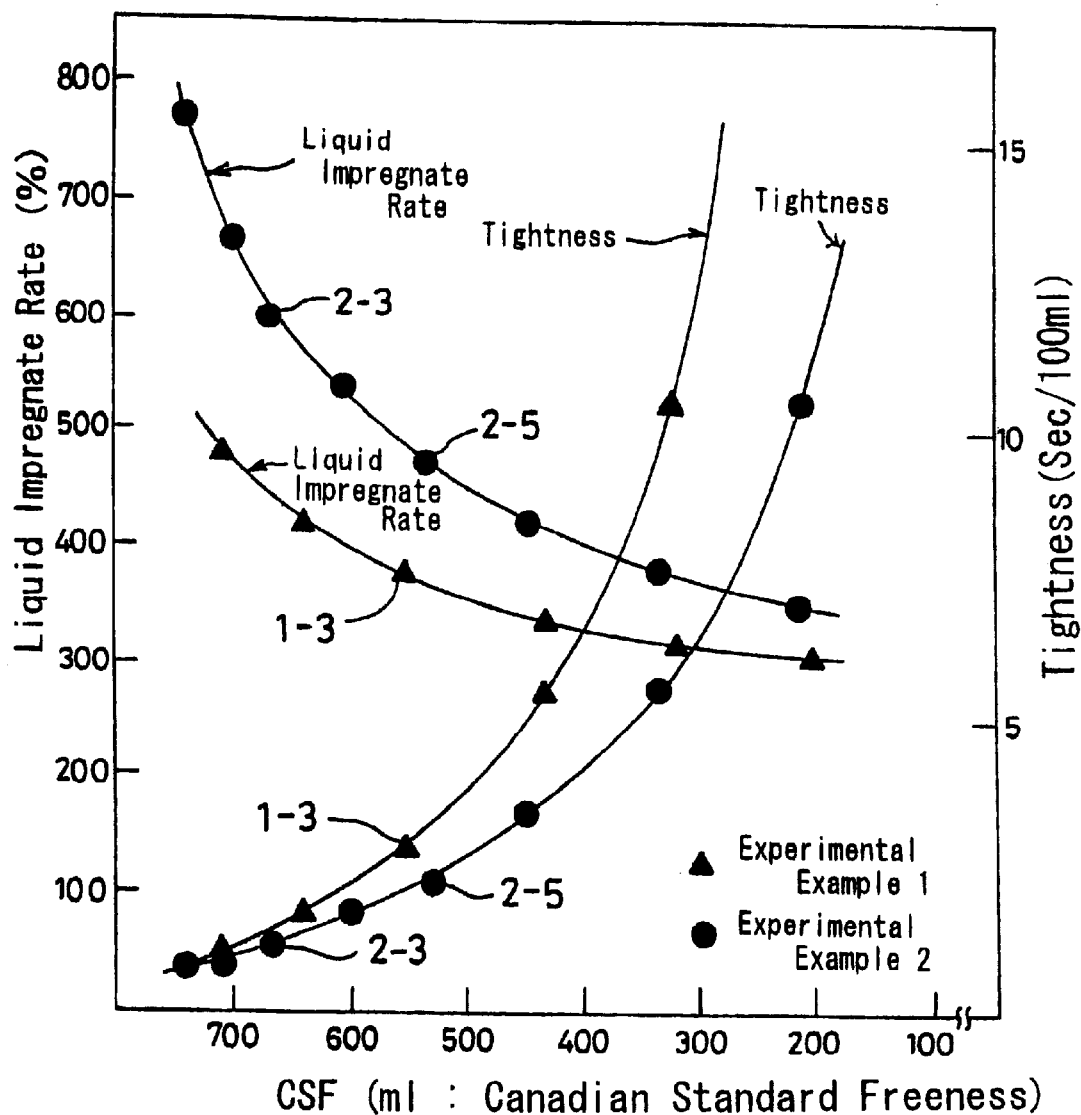
FIG. 4 is a graphic representation of the relations between the CSF value and the airtightness and the relations between the CSF value and the liquid impregnate ratio.

A third embodiment of the paper making process according to the present invention by using a cylinder-Fourdrinier combination machine for laminating a liquid impregnate layer on one side of the dense layer to provide an integrated paper is shown in FIG. 3, in which a similar portion, with that of the first embodiment shown in FIG. 1, is given the same number and a similar description which is not mentioned here. The third embodiment has a long mesh of the cylinder-Fourdrinier combination machine, with which the dense layer is made. As shown in FIG. 3, the furnish 17 for the dense layer contained in a long mesh inlet 16 is supplied onto the cylindrical surface of the long wire mesh 18 rotating under the long mesh inlet 16 to form a paper 8a of a continuous liquid impregnate layer on the cylindrical surface of the long wire mesh 18. The paper layer 8a thus formed is then transferred from the mesh onto the wet felt 4. The paper layer 8a carried on the wet felt 4 in similar manner as the first embodiment is then overlaid with the paper layer 8b for the liquid impregnate layer to form the laminated paper layer 8 (i.e. the paper layers 8a+8b), and similar processes follow as described in the first embodiment.

In paper making using the cylinder paper machine, the fibers are taken out from the dispersion of raw materials stock by the mesh and attached on the peripheral surface of the cylinder mould which is positioned inside of the cylinder vat, and from which a continuous paper layer is formed. During this process, the level of the stock inside of the cylinder mould is always controlled to be at a constant level which is lower than the level of the cylinder vat. In this method of paper making, a level difference thus produced is used to make a homogeneous paper layer on the mesh. Therefore, the raw materials stock, the beating of which is overdone resulting in freeness worsened, tends to easily occur clogging, which in turn degrades the freeness. In such a circumstance, it does not provide the level difference more than the diameter of the cylinder mould even though the level difference is made to be larger one so that the paper making speed is significantly lowered for the raw materials stock of excessive beating. Therefore, the paper making by using the cylinder paper machine is suitable for making paper for the dense layers or the liquid impregnate layers which include cellulose fibers of the beating degree of more than CSF 100 ml.

On the other hand, in the paper making method using Fourdrinier paper machine, the fibers are taken out from the dispersion of the raw materials stock by a rotating endless mesh which is arranged in the shape of a conveyer, and on which a continuous paper layer is formed. In this process, the time duration of freeness of the humidity dispersion of the raw material can be lengthened, since it employs such a mesh in the shape of the conveyer, and alternatively the humidity dispersion can be made through the mesh in the shape of the conveyer, and under the mesh a suction pump can be attached in order to enhance its fineness. Therefore, despite the raw materials stock, the beating of which is overdone resulting in freeness worsened, it is ensured to have a satisfactory fineness without any significant problem. So, the paper making by using the lengthened mesh is suitable for making paper for the dense layer which includes cellulose fibers of excessive beating of less than 100 ml CSF.

Embodiment Example

Now some specific embodiment examples of the separator paper for the alkaline-battery according to the present invention and the comparison example of the conventional paper made for this comparison are shown. Note that measured values of the embodiment examples, the experimental examples and the conventional separator papers are measured by following methods.

1) CSF (Canadian Standard Freeness)

Measurements have been performed based on CSF which is defined by JIS P 8121.

2) Thickness.

The thickness of the separator paper obtained is determined by measuring five predetermined positions of the paper by use of a dial thickness gauge, and averaging thus measured values.

3) Basis Weight and Tensile Strength

The basis weight of the separator paper is measured on the conditions specified by JIS P 8124, and the tensile strength for the machine direction of the paper is measured on the conditions specified by JIS P 8113.

4) Airtightness

The airtightness is determined by measuring the required time (sec/100 ml) during which 100 ml of air passes through the cylindrical surface of a separator paper having a 6 mm diameter, wherein the paper is inserted into an aperture having a 6 mm diameter, which is attached to the test-piece attachment on the underside of the type B measurement device operating on the JIS P 8117 standard (which specifies an air permeability test method for paper and paper board).

5) Liquid Impregnate Ratio

To measure the liquid impregnate ratio, a 50 mm×50 mm square sheet is cut out from the separator paper, dried and measured its weight, and which is then immersed into 40% KOH solution for 10 minutes. This test specimen is stretched onto a inclined glass plate, at 45 degrees holding its state for three minutes, during which the excessive KOH solution is removed and provided to the measurement of the weight of the specimen, and the impregnate rate is calculated from the following equation;

Liquid impregnate ratio (%)=(W2−W1)/W1×100 where W1=weight before immersion, W2=weight after immersion.

6) Thickness After Expansion

To measure the thickness of the separator paper, it is immersed into 40% KOH solution for 30 minutes, and the thickness of the paper is measured by the the dial thickness gauge.

7) Alkali Proof (Shrinkage Percentage)

To measure the alkali proof of the separator paper, a 100 mm×100 mm square sheet is precisely cut out from the separator paper to provide a specimen, which is immersed into 40% KOH solution at a temperature of 60° C. for 24 hours and then washed by water. The vertical and horizontal lengths of the specimen are measured and then the shrinkage percentage of the area is calculated by the following equation.

shrinkage percentage (%)=(A1−A2)/A1×100 where A1=area before immersion, A2=area after immersion.

8) Liquid Aspiration

To measure the liquid aspiration, a 15 mm×200 mm rectangle sheet is cut out from the separator paper to provide a specimen, which is vertically suspended, and more than 3 mm of its underside is immersed into 40% KOH solution for 3 minutes and the penetrant height of the solution is measured as the liquid aspiration (mm).

[Embodiment Example 1]→Dense Layer+Liquid impregnate layers of the dual structure made by the cylinder multi-layer paper machine shown in FIG. 1.

For the dense layer, 63 weight % of mercerized hardwood pulp is conditioned by beating up to 290 ml CSF by a double discrifiner and mixed with 25 weight % of vinylon fibers (fineness 0.5 d×fiber length 2 mm) and 12 weight % of polyvinylalcohol fibers (fineness 1 d×fiber length 3 mm) to provide a furnish. Also, for the liquid impregnate layer, 63 weight % of polynosic rayon fibers (fineness 0.5 d×fiber length 2 mm), 25 weight % of vinylon fibers (fineness 0.5 d×fiber length 2 mm) and 12 weight % of polyvinylalcohol fibers (fineness 1 d×fiber length 3 mm) are mixed together to provide a furnish. Note that unbeaten polynosic rayon fibers have been used, and its CSF value was 740 ml. These raw materials are sent into the two cylinder vats respectively, and are then laminated. In paper making, the basis weight for the dense layer is held to be 12 g/m² of constant value, and only for the liquid impregnate layer, the basis weight is changed, such as 24.6–49.5 g/m² as shown in Table 1 to in order to make a separator paper for the alkaline-battery according to the present invention.

TABLE 1

| Embodiment Example | Layer Structure (g/m²) | | Basis Weight g/m² | Thickness μm | Tensile Strength Kg/15 mm | Airtightness Sec/100 ml | Liquid | |
|---|---|---|---|---|---|---|---|---|
| | Dense Layer | Liquid Impregnate Layer | | | | | Impregnate Ratio % | Liquid Aspiration mm |
| 1-1 | 12.0 | 12.6 | 24.6 | 74 | 3.6 | 4.1 | 605 | 35 |
| 1-2 | 12.0 | 20.4 | 32.4 | 104 | 5.0 | 4.3 | 620 | 44 |
| 1-3 | 12.0 | 29.3 | 41.3 | 139 | 6.3 | 4.5 | 665 | 48 |
| 1-4 | 12.0 | 37.5 | 49.5 | 162 | 7.0 | 5.2 | 690 | 52 |

In the embodiment example 1-1, the basis weight is approximately similar for both the dense layer and the liquid impregnate layer. By integrally laminating the dense layer and the liquid impregnate layer, 4.1 sec/100 ml of the airtightness and 605% of the liquid impregnate ratio are attained. Also, by increasing the basis weight such as shown in the embodiment examples 1-2, 1-3 and 1-4, the liquid impregnate ratio is increased up to 620, 650 and 690% respectively, and by increasing the basis weight for the whole separator paper, increased airtightness is also provided. The embodiment example 1-2 shown in Table 1 has is formed by the raw materials stock for the dense layer as shown in FIG. 2, is placed in the middle layer position, and both sides of the liquid impregnate layers, which are formed by the same basis weights and the same raw materials stock, are equally placed together to provide a laminated paper. In paper making, the basis weight for the dense layer is held to 10 g/m² of constant value, and only for the low dense layers, the basis weights are equally changed, such as 33.0–40.0 g/m² as shown in Table 2 to in order make a separator paper for the alkaline-battery according to the present invention.

TABLE 2

| Embodiment Example | Layer Structure (g/m²) | | | Basis Weight g/m² | Thickness μm | Tensile Strength Kg/15 mm | Airtightness Sec/100 ml | Liquid | |
|---|---|---|---|---|---|---|---|---|---|
| | Liquid Impregnate Layer | Dense Layer | Liquid Impregnate Layer | | | | | Impregnate Ratio % | Liquid Aspiration mm |
| 2-1 | 11.5 | 10.0 | 11.5 | 33.0 | 108 | 4.0 | 2.5 | 630 | 32 |
| 2-2 | 15.0 | 10.0 | 15.0 | 40.0 | 115 | 4.9 | 2.8 | 640 | 34 |

32.4 g/m² of the basis weight for the whole separator paper, which is approximately similar to that of Tables 9 and 10 respectively. The results of the experimental example 1-4 of Table 9 show that 5.5 sec/100 ml of the airtightness and 340% of the liquid impregnate ratio are attained, while the results of the experimental example 2-2 show that 670% of the liquid impregnate ratio is attained, but only 0.8 sec/100 ml of the airtightness is attained. However, in the experimental example 1-2, 4.3 sec/100 ml of the airtightness and 620% of the liquid impregnate ratio are attained, which simultaneously ensure the improved denseness that can prevent the internal shortage due to the deposition of the zinc oxide dendrite accompanied by not adding mercury, and the improved liquid impregnate properties that can increase the heavy discharging capacity.

Note that the embodiment example 1 has the separator paper which is made by contacting the dense layer to the drier surface in order to dry itself, and when the airtightness of the liquid impregnate layer is compared with that of the dense layer, both layers have touched the drier surface, the former exhibits lower airtightness than that of the latter, but the separator paper of the former has a higher liquid impregnate ratio. For example, in the case where the liquid impregnate layer has the same material and the same structure as that of the embodiment example 1-2 is made by touching it to the drier, the separator paper having 3.2 sec/100 ml of the airtightness and 650% of the liquid impregnate ratio is attained.

[Embodiment Example 2]→Liquid impregnate layer+ Dense Layer+Liquid impregnate layers of the triplet structure made by the cylinder multi-layer paper machine shown in FIG. 2.

For the dense layer, 50 weight % of the linter pulp is conditioned by beating up to 200 ml CSF by a double discrifiner and mixed with 40 weight % of vinylon fibers (fineness 0.5 dxfiber length 2 mm) and 10 weight % of polyvinylalcohol fibers (fineness 1 dxfiber length 3 mm) to provide furnish. Also for the liquid impregnate layer, 60 weight % of the normal rayon fibers (fineness 0.7 dxfiber length 3 mm), 28 weight % of the vinylon fibers (fineness 0.5 dxfiber length 2 mm) and 12 weight % of the polyvinylalcohol fibers (fineness 1 dxfiber length 3 mm) are mixed to provide furnish. Note that normal, unbeaten rayon fibers have been used and their CSF value was 760 ml. These raw materials are sent into the three cylinder vats of the paper making machine respectively such that a paper layer, which The embodiment example 2 shown in Table 2 has a three layered structure of the Liquid impregnate layer+Dense Layer+Liquid impregnate layer, and for example, as shown in the embodiment example 2-1, it has simultaneously attained 2.5 sec/100 ml of the airtightness and 630% of the liquid impregnate ratio. The present invention may have a layer which includes a dense layer, on both sides of which liquid impregnate layers are integrally laminated. Preferably, for the three layered structure the dense layer is put in the middle position such that the liquid impregnate layer can maintain the electrolyte, and on both sides the liquid impregnate layers are integrally laminated respectively. This is because the impregnation rate of the electrolyte is lowered when the dense layers are laminated on both sides of the liquid impregnate layer, and a longer immersion time is required in the immersion step of the battery cell, and an inadequate immersion tends to occur as the bubbles remained in the separator paper. It is important that the electrolyte is being held in the plane with which the active material contacting in order to increase the heavy discharging properties.

[Embodiment Example 3]→Two layered structure of Dense Layer+Liquid impregnate layer made by the cylinder-Fourdrinier combination machine shown in FIG. 3.

For the dense layer, solvent spinning rayon fibers (fineness 1.5 dxfiber length 4 mm):70 weight % of Tencel (Tencel is the trade mark of Coutlouse Co. in Great Britain) is conditioned by beating up to 10 ml CSF by a double discrifiner and then mixed with 25 weight % of vinylon fibers (fineness 0.5 dxfiber length 2 mm) and 5 weight % of polyvinylalcohol fibers (fineness 1 dxfiber length 3 mm) to provide a furnish. Also for the liquid impregnate layer, 60 weight % of polynosic rayon fibers (fineness 0.5 dxfiber length 2 mm), 25 weight % of vinylon fibers (fineness 0.5 dxfiber length 2 mm) and 15 weight % of polyvinylalcohol fibers (fineness 1 dxfiber length 3 mm) to provide a furnish. Note that unbeaten polynosic rayon fibers have been used and their CSF value was 740 ml. These raw materials are carried to the long mesh inlet of the Fourdrinier paper machine, while the furnish for the liquid impregnate layers is carried to the cylindrical mesh vat to make a laminated paper for 20.2–39.6 g/m² of the basis weight as shown in Table 3 of the separator paper of the alkaline-battery, according to the present invention.

TABLE 3

| Embodiment Example | Layer Structure (g/m²) | | Basis Weight g/m² | Thickness μm | Tensile Strength Kg/15 mm | Airtightness Sec/100 ml | Liquid | |
|---|---|---|---|---|---|---|---|---|
| | Dense Layer | Liquid Impregnate Layer | | | | | Impregnate Ratio % | Liquid Aspiration mm |
| 3-1 | 10.0 | 10.2 | 20.2 | 67 | 3.0 | 20.4 | 630 | 30 |
| 3-2 | 10.0 | 15.2 | 25.2 | 80 | 3.5 | 25.6 | 660 | 38 |
| 3-3 | 10.0 | 22.8 | 32.8 | 107 | 4.8 | 27.5 | 670 | 45 |
| 3-4 | 17.0 | 22.6 | 39.6 | 121 | 6.6 | 57.2 | 570 | 45 |

The embodiment example 3 is shown in Table 3 in which the solvent spinning rayon fibers is conditioned up to 10 ml CSF so that the long mesh section of the cylinder-Fourdrinier combination machine is used in making the dense layer. Airtightness of 27.5 sec/100 ml is attained as shown in the embodiment example 3-3, for example since the large beating degree is selected for the cellulose fibers of the dense layer and at same time 670% of the liquid impregnate ratio is also attained.

[Embodiment Examples 4–7]→Two layered structure of Dense Layer+Liquid impregnate layer made by the cylinder multi-layer paper machine in FIG. 1.

Similarly as the embodiment example 1, the raw materials shown in Table 4 is used in making the two layered laminated paper by the cylinder multi-layer paper machine which has two cylinder moulds as shown in FIG. 1 and a laminated paper for the separator paper of the alkaline-battery according to the present invention is manufactured as shown in Table 5.

TABLE 4

| | Kinds of Layer | Material Contents | Material Ratio % |
|---|---|---|---|
| Embodiment Example 4 | Dense Layer | Polynosicrayon fibers(0.5 d × 2 mm) CSF470 ml beating | 60 |
| | | Vinylon fibers(0.5 d × 2 mm) | 25 |
| | | Polyvinylalcohol fibers(1 d × 3mm) | 15 |
| | Liquid Impregnate Layer | Polynosicrayon fibers(0.5 d × 2 mm) CSF720 ml beating | 60 |
| | | Vinylon fibers(0.5 d × 2 mm) | 30 |
| | | Polyvinylalcohol fibers(1 d × 3 mm) | 10 |
| Embodiment Example 5 | Dense Layer | Softwoodprehydride pulp CSF210 ml beating | 30 |
| | | Vinylon fibers(0.5 d × 2 mm) | 60 |
| | | Polyvinylalcohol fibers(1 d × 3 mm) | 10 |
| | Liquid Impregnate Layer | Polynosicrayon fibers(3d × 5 mm) CSF780 ml (unbeaten) | 50 |
| | | Nylon-6 fibers(1.5 d × 5 mm) | 40 |
| | | Polyvinylalcohol fibers(1 d × 3 mm) | 10 |
| Embodiment Example 6 | Dense Layer | Mercerizedhardwood pulp CSF220 ml beating | 50 |
| | | Vinylon fibers(0.5 d × 2 mm) | 40 |
| | | Polyvinylalcohol fibers(1 d × 3 mm) | 10 |
| | Liquid Impregnate Layer | Normalrayon fibers(1.5 d × 5 mm) CSF770 ml (unbeaten) | 25 |
| | | Vinylon fibers(1.0 d × 2 mm) | 45 |
| | | Polypropylene-ethylenevinylalcohol copolymer fibers (2 d × 5 mm) | 30 |
| Embodiment Example 7 | Dense Layer | Mercerizedhardwood pulp CSF150 ml beating | 30 |
| | | Vinylon fibers(0.5 d × 2 mm) | 60 |
| | | Polyvinylalcohol fibers(1 d × 3 mm) | 10 |
| | Liquid Impregnate Layer | Mercerizedsoftwood pulp CSF760 ml (unbeaten) | 20 |
| | | Polynosicrayon fibers(1 d × 3 mm) CSF770 ml (unbeaten) | 50 |
| | | Vinylon fibers(1 d × 3 mm) | 20 |
| | | Polyvinylalcohol fibers(1 d × 3 mm) | 10 |

TABLE 5

| Embodiment Example | Layer Structure (g/m²) | | Basis Weight g/m² | Thickness μm | Tensile Strength Kg/15 mm | Airtightness Sec/100 ml | Liquid | |
|---|---|---|---|---|---|---|---|---|
| | Dense Layer | Liquid Impregnate Layer | | | | | Impregnate Ratio % | Liquid Aspiration mm |
| 4 | 20.0 | 12.2 | 32.2 | 105 | 4.3 | 2.4 | 590 | 45 |
| 5 | 10.3 | 22.2 | 32.5 | 115 | 3.6 | 2.6 | 660 | 44 |
| 6 | 10.6 | 22.0 | 32.6 | 107 | 5.0 | 4.6 | 580 | 40 |
| 7 | 7.0 | 25.0 | 32.0 | 112 | 4.1 | 2.8 | 710 | 47 |

The embodiment examples 4 to 7 as shown in Table 4 describe the specific examples of several combinations of the cellulose fibers applicable according to the present invention and the synthetic fibers, and each of the examples have simultaneously attained the airtightness and liquid impregnate ratio which satisfy the objects of the present invention as shown in Table 5.

[Embodiment Example 8]→Two layered structure of Dense Layer+Liquid impregnate layer made by lamination. The base papers for the dense layer and the liquid impregnate layer are separately made, and the both papers are bonded together to provide a two layered separator paper. For the dense layer, 60 weight % of mercerized hardwood pulp is conditioned by beating up to 270 ml CSF by a double discrifiner and 30 weight % of mixed with vinylon fibers (fineness 0.5 d×fiber length 2 mm) and 10 weight % of polyvinylalcohol fibers (fineness 1 d×fiber length 3 mm) are mixed together to provide a furnish of raw materials, which is in turn carried to the cylinder paper machine through which a base paper of a single layer for the dense layer is made having 9.5 g/m² of the basis weight.

Also, for the liquid impregnate layer, 60 weight % of polynosic rayon fibers (fineness 0.5 d×fiber length 2 mm), 30 weight % of vinylon fibers (fineness 0.5 d×fiber length 2 mm) and 10 weight % of polyvinylalcohol fibers (fineness 1 d×fiber length 3 mm) are mixed together to provide a furnish, from which a base paper having a single layer for two kinds of the liquid impregnate layers of 16.2 g/m² and 22.4 g/m² of the basis weight is made by means of the cylinder paper machine. The polynosic rayon fiber is used unbeaten and has 740 ml CSF. Bonding of the base papers for the dense layer and the liquid impregnate layer was performed by use of a coater which has a cylinder drier. In the first step, the base papers for the dense layer and the liquid impregnate layer are overlaid and immersed into water to be saturated and then transferred to the surface of the drier, with which the overlaid layers are dried and simultaneously pressed onto the surface with rollers of the drier. Thereby, polyvinylalcohol fibers included ill the base paper is dissolved again by heating and the two layers of the base paper are bonded together. In this manner, the separator paper is attained for the alkaline-battery according to the present invention as shown in Table 6.

shows that 2.1 sec/100 ml of the airtightness and 730 % of the liquid impregnate ratio are simultaneously attained, for example, as shown in the embodiment example 8-1, even though the layer is made of an integrally bonded layer, for example, as shown in the embodiment example 8-1.

[Prior Art Example 1]

60 weight % of the unbeaten mercerized softwood pulp, 25 weight % of vinylon fibers (fineness 1 d×fiber length 3 mm) and 15 weight % of polyvinylalcohol fibers (fineness 1 d×fiber length 3 mm) are mixed to provide a furnish. This furnish is sent to the cylinder paper machine and a single layered conventional separator paper having approximately 32 g/m² of basis weight is attained. This separator paper is disclosed by the Japanese Patent Laid-Open Publication No.54-87824, the applicant of which is the same as that of the present invention. It should be noted that the adding mercury to zinc active material of the alkali manganese battery is not yet prohibited at the time of this application.

[Prior Art Example 2]

30 weight % of the mercerized hardwood pulp is conditioned to 280 ml CSF of beating, 55 weight % of vinylon fibers (fineness 0.5 d×fiber length 2 mm) and 15 weight % of polyvinylalcohol fibers (fineness 1 d×fiber length 3 mm) are mixed to provide a furnish. This furnish is sent to the cylinder paper machine and a single layered conventional separator paper having basis weight of approximately 32 g/m² is attained. This separator paper is disclosed by the Japanese Patent Laid-Open Publication No.2-119049, the applicant of which is the same as that of the present invention. The technique disclosed in this invention for making the separator paper is still useful at the present time even though not adding mercury to zinc active material of the alkali manganese battery is allowed.

[Prior Art Example 3]

52 weight % of polynosic rayon fibers is beaten to 450 ml CSP of beating, and mixed with 33 weight % of vinylon fibers (fineness 0.3 d×fiber length 2 mm) and 15 weight % of polyvinylalcohol fibers (fineness 1 d×fiber length 3 mm) are mixed to provide a furnish. This furnish is sent to the cylinder paper machine and a single layered conventional separator paper having approximately 32 g/m² of basis weight is attained. This separator paper is disclosed by the Japanese Patent Laid-Open Publication No.5-74439. The object of this technique is to propose an improved alkali

TABLE 6

| | | Laminated Base Paper | | Separator Paper After Laminated | | | | | |
|---|---|---|---|---|---|---|---|---|---|
| Embodiment Example | | Basis Weight g/m² | Thickness μm | Basis Weight g/m² | Thickness μm | Tensile Strength Kg/15 mm | Airtightness Sec/100 ml | Impregnate Ratio % | Liquid Aspiration mm |
| 8-1 | Dense Layer -Base Paper | 9.5 | 25 | 25.7 | 90 | 3.2 | 2.1 | 730 | 38 |
| | Liquid Impregnate Layer -Base Paper | 16.2 | 80 | | | | | | |
| 8-2 | Dense Layer -Base Paper | 9.5 | 25 | 31.9 | 115 | 4.1 | 2.7 | 740 | 47 |
| | Liquid Impregnate Layer -Base Paper | 22.4 | 95 | | | | | | |

The embodiment example 8 as shown in Table 6 describes bonding the dense layer and the liquid impregnate layer to a integrally laminated layer. This laminated layer bonding manganese battery without adding mercury to the zinc active material of the battery. These prior art examples 1 to 3 are shown in Table 7.

TABLE 7

| Prior Art Example | Beating Degree of Cellulose Fibers CSF (ml) | Basis Weight g/m² | Thickness μm | Tensile Strength kg/15 mm | Airtightness Sec/100 ml | Liquid Impregnate Ratio % | Liquid Aspiration mm |
|---|---|---|---|---|---|---|---|
| 1 | 160 | 32.0 | 125 | 3.0 | 1.0 | 520 | 32 |
| 2 | 280 | 32.5 | 104 | 5.0 | 5.7 | 330 | 27 |
| 3 | 450 | 32.1 | 95 | 4.7 | 3.5 | 400 | 29 |

The prior art example 1 shown in Table 7 is not allowed today since these techniques were used at a time when the addition of mercury was permitted so, there was no need to consider the internal shortage caused by zinc oxide dendrite and no practical problems occurred even at 1.0 sec/100 ml of the airtightness, and 520% of the liquid impregnate ratio was selected considering mainly this rate itself and this technique is not allowed to use today.

The prior art example 2 shown in Table 7 is still used today since this technique has been realized such as 5.7 sec/100 ml of the airtightness value considering mercury was not added, but its liquid impregnate ratio remains within 330% which can not satisfy the presently required improvement for the heavy discharging. Currently the airtightness able to prevent internal shortages caused by the deposition of zinc oxide is not only required to be maintained, but also required to increase the liquid impregnate ratio.

The prior art example 3 shown in Table 7 uses vinylon fibers for mixing the cellulose fibers which are expensive fibers having a small fineness such as a diameter of 0.3 d high, but its liquid impregnate ratio remains within 400% which is not sufficient to improve the heavy discharging requirements.

Therefore, LR-6 alkali manganese battery is made by using the separator papers of the embodiment examples 1 to 8 described above and the prior art examples 1 to 3, and to which 2 Ω load discharge experiments (to measure the time period when the battery voltage falls to 0.9 V of final voltage with 2 Ω load), and intermittent discharge experiments (to measure the battery voltage after 50 days later with 3.9 Ω load discharginng 5 min/day) are conducted, and the results of these experiments are listed in Table 8. In making the battery, the liquid impregnate layer of the separator paper is positioned so as to contact with the active material of the anode, and the number of windings is determined so as the separator to have approximately equal basic weight. Alternatively, the dense layer may be positioned such that it contacts with the anode active material.

TABLE 8

| | Separator | | | | | Experimental Result for | |
|---|---|---|---|---|---|---|---|
| | Characteristic Property of Separator Paper | | | | | Discharging Characteristics | |
| Separator Paper | Airtightness Sec/100 ml | Liquid Impregnate Ratio % | Liquid Aspiration mm | Shrinkage Percentage % | Number of Winding | 2Ω Discharge Minute | Intermittent Discharging V |
| Experimental Example 1-1 | 4.1 | 605 | 35 | 4.1 | 4 | 160 | 1.2 |
| Experimental Example 1-2 | 4.3 | 620 | 44 | 4.3 | 3 | 159 | 1.1 |
| Experimental Example 1-4 | 5.2 | 690 | 52 | 5.0 | 2 | 157 | 1.1 |
| Experimental Example 2-1 | 2.5 | 630 | 32 | 4.2 | 3 | 160 | 1.1 |
| Experimental Example 3-2 | 25.6 | 660 | 38 | 4.3 | 4 | 158 | 1.2 |
| Experimental Example 3-3 | 27.5 | 670 | 45 | 4.7 | 3 | 153 | 1.2 |
| Experimental Example 4 | 2.4 | 590 | 45 | 5.0 | 3 | 154 | 1.1 |
| Experimental Example 5 | 2.6 | 660 | 44 | 3.7 | 3 | 157 | 1.1 |
| Experimental Example 6 | 4.6 | 580 | 40 | 4.3 | 3 | 148 | 1.1 |
| Experimental Example 7 | 2.8 | 710 | 47 | 3.9 | 3 | 159 | 1.1 |
| Experimental Example 8-1 | 2.1 | 730 | 38 | 4.4 | 4 | 164 | 1.1 |
| Experimental Example 8-2 | 2.7 | 740 | 47 | 4.6 | 3 | 161 | 1.1 |
| Prior Art Example 1 | 1.0 | 520 | 32 | 3.5 | 3 | 140 | 0.2 |
| Prior Art Example 2 | 5.1 | 330 | 27 | 2.8 | 3 | 135 | 1.1 |
| Prior Art Example 3 | 3.5 | 400 | 31 | 5.0 | 3 | 138 | 1.1 |

As shown in Table 8, every embodiment example shows that the battery which have been employed the separator paper made by the embodiment examples of the present invention can attain a long discharging time of more than 148 minutes in the experiment of heavy discharging of discharging current with 2 Ω resistance value and the battery life in the heavy discharging is remarked improved compared with the prior art examples 1 to 3. Also, each of these embodiment examples show that each of the batteries maintain the discharging voltage of more than 1.1 V after the intermittent discharge experiment, and can prevent the internal shortage caused by the deposition of to zinc oxide dendrite within the battery. However, in each of the prior art examples 1 to 3, the discharging time is shown to be less than any one of the embodiment examples, according to the present inventions. Each of the embodiment examples of the present invention show that improvements have been attained in the heavy discharging with 8 minutes minimum and 29 minutes maximum when compared with that of prior art examples 1 to 3. That is, significant improvement has been attained. Also, as shown in Table 8, each of the embodiment examples according to the present invention show that they have a higher absorption velocity of the electrolyte so that it contributes in decreasing the injection time of the electrolyte. In the rate of shrinkage relating to its alkali proof, the paper of this invention shows approximately the same with that of the prior art examples 1 to 3, and practically no significant problem occurs in regard to the alkali proof.

In the prior art examples 1 to 3, the prior art example 1 shows that 140 minutes of the discharging time is attained, but intermittent discharging had decreased the voltage of the battery to 0.2 V indicating that the airtightness of the separator paper, that is, denseness is so low that it cannot prevent the internal shortage caused by the deposition of zinc oxide dendrite within the battery. Each of the prior art examples 2 and 3 show that the discharging time is less than 140 minutes while it maintains 1.1 V of the battery voltage after the intermittent discharge experiment. This means that the liquid impregnate ratio was insufficient and the quantity of the electrolyte impregnate in the separator of the battery has leaked during the heavy discharging, which resulted in a shorter battery life.

Also, as shown in Table 8, each of the embodiment examples according to the present invention show that it has a higher absorbing velocity of the electrolyte so that it contributes in decreasing injection time of the electrolyte. In the rate of shrinkage relating alkali proof, the paper of this invention shows approximately the same rate as that of the prior art, so that it is clear there is practically no significant problem occurring in regards to its alkali proof The present invention intends to improve the alkali primary battery, but it a is also applicable to the alkali secondary battery, such as nickel zinc battery, nickel hydrogen battery etc., with a low power type of battery which allows the overcharge in the order of 10%.

As described in details above, the separator paper according to the present invention can provide a structure for integrally laminating a dense layer for keeping its denseness, and a liquid impregnate layer for increasing the liquid impregnate ratio of the electrolyte so that, said dense layer can have sufficient denseness suitable in preventing migration of the active materials of both electrodes, and the zinc oxide dendrite within the battery, and said liquid impregnate layer can have a sufficient liquid impregnate property for the electrolyte required to support heavy discharging of the battery, and said dense layer can have a higher denseness than that of the prior art as well as said liquid impregnate layer can be made to have a more suitable liquid impregnate property of the electrolyte, that is, said liquid impregnate layer expands in the electrolyte for holding the required quantity of the electrolyte in heavy discharging, while said dense layer, which includes cellulose fibers conditioned by beating, shows far less expansion in thickness when compared with that of said liquid impregnate layer in the electrolyte. Thus, it shows only a slight expansion in the respective hole diameter of the dense layer accompanied by its expansion in the electrolyte, and the denseness of the separator paper in the electrolyte is not degraded although the liquid impregnate ratio of said liquid impregnate layer is increased by laminating said dense layer and with liquid impregnate layer.

Therefore, the separator paper can provide a denseness and high liquid impregnate ratio. It satisfies the requirements of both the denseness; that can prevent the internal shortage due to the deposition of the zinc oxide dendrite accompanied by not adding mercury, and the increased liquid impregnate; which improves the heavy discharging capacity.

Also, according to the present invention, since the integrally overlaying process of more than two layers of the base paper exists in the paper making according to the present invention, it can make the holes caused by the pin holes and air bubbles and the variations in the diameters of the holes, which are produced during the making of the base paper, to be smaller and narrower so that the reliability for preventing the internal shortage separator paper is increased when compared with a single layered separator paper of the prior art. Further, according to the present invention, since a plurality of porous liquid impregnate layers is laminated, it can increase the impregnating speed of the electrolyte so that the injection time of it during the assembly of the battery can be decreased, which in turn can contribute to the productivity of the battery, when compared with a single layered separator paper of the prior art, which has the similar airtightness.

What is claimed is:

1. A separator paper for electrically isolating an anode active material and a cathode active material of an alkaline-battery, comprising:
    a) a dense layer having alkali-proof cellulose fibers and synthetic fibers to provide an airtightness in the range of 2 sec/100 ml to 100 sec/100 ml; and
    b) a liquid impregnate layer integrally laminated to said dense layer, said liquid impregnate layer having alkali-proof cellulose fibers and synthetic fibers to provide a liquid impregnate ratio of more than 550%.

2. A separator paper as in claim 1, and further comprising another liquid impregnate layer integrally laminated to another side of said dense layer.

3. A separator paper for electrically isolating an anode active material and a cathode active material of an alkaline-battery, comprising:
    a) a dense layer having alkali-proof cellulose fibers and synthetic fibers to provide an airtightness in the range of 2 sec/100 ml to 100 sec/100 ml; and
    b) a liquid impregnate layer integrally laminated to said dense layer, said liquid impregnate layer having alkali-proof cellulose fibers and synthetic fibers to provide a liquid impregnate ratio of more than 600%.

4. A separator paper as in claim 3, and further comprising another liquid impregnate layer integrally laminated to another side of said dense layer.

5. A separator paper for electrically isolating an anode active material and a cathode active material of an alkaline-battery, comprising:

a) a dense layer;
b) a liquid impregnate layer integrally laminated to said dense layer;
c) said dense layer being made by mixing alkali proof cellulose fibers which are applicable for beating with synthetic fibers such that said alkali proof cellulose fibers are included in the range of 20 to 80 weight % with a beating degree of 500 ml to 0 ml at CSF value; and
d) said liquid impregnate layer being made by mixing alkali proof cellulose fibers with synthetic fibers, said alkali proof cellulose fibers are included in the range of 20 to 80 weight % with a beating degree of more than 700 ml at CSF value.

6. A separator paper as in claim 5, wherein:
a) said dense layer has an airtightness in the range of 2 sec/100 ml to 100 sec/100 ml; and
b) said liquid impregnate layer has a liquid impregnate ratio of more than 550%.

7. A separator paper as in claim 5, wherein:
a) said dense layer has an airtightness in the range of 2 sec/100 ml to 100 sec/100 ml; and
b) said liquid impregnate layer has a liquid impregnate ratio of more than 550%.

8. A separator paper as in claim 5, wherein said alkali proof cellulose fibers used in said dense layer are applicable for beating with a beating degree of 300 to 100 ml at CSF value.

9. A separator paper as in claim 5, wherein said alkali proof fibers used in said dense layer are applicable for beating and include at least one selected from mercerized wood pulp, linter pulp, polynosic rayon fiber, organic solvent forming rayon fiber, and prehydride pulp.

10. A separator paper as in claim 5, wherein said dense layer has a basis weight of more than 5 g/m$^2$ and less than 50% relative to the whole basis weight of said separator paper.

11. A separator paper as in claim 5, wherein said alkali proof cellulose fibers used in said liquid impregnate layer have an unbeaten degree.

12. A separator paper as in claim 5, wherein said alkali proof cellulose fibers used in said liquid impregnate layer include regenerated fibers having fiber lengths of 2–10 mm.

13. A separator paper as in claim 5, wherein said synthetic fibers includes at least one selected from polyvinylalcohol fibers, polypropylene-polyethylene compound fibers, polypropylene-ethylenevinylalcolhol copolymer compound fibers, polyamide-denaturation polyamide compound fibers, polypropylene-synthetic pulp, and polyethylene-synthetic pulp.

14. A separator paper as in claim 5, and further comprising one of polyvinylalcohol fibers and polyvinylalcohol powder to be added as a binder with 5 to 20 weight % relative to the whole weight of said separator paper.

15. A separator paper as in claim 5, wherein said synthetic fibers be used in said dense layer and said liquid impregnate layer include polyamide fibers.

16. A separator paper as in claim 5, wherein said synthetic fibers used in said dense layer and said liquid impregnate layer include vinylon fibers.

* * * * *

UNITED STATES PATENT AND TRADEMARK OFFICE
CERTIFICATE OF CORRECTION

PATENT NO.   : 6,379,836 B1
DATED        : April 30, 2002
INVENTOR(S)  : Kubo et al.

It is certified that error appears in the above-identified patent and that said Letters Patent is hereby corrected as shown below:

<u>Title page,</u>
Item [*], Notice, delete "0" and insert -- 452 --.

Signed and Sealed this

First Day of July, 2003

JAMES E. ROGAN
*Director of the United States Patent and Trademark Office*